US007858899B2

(12) United States Patent
Fujii et al.

(10) Patent No.: US 7,858,899 B2
(45) Date of Patent: Dec. 28, 2010

(54) COAXIAL MICROWAVE PLASMA TORCH

(75) Inventors: Shuitsu Fujii, Hiroshima (JP); Raju Ramasamy, Hiroshima (JP); Takuya Urayama, Hiroshima (JP); Kazunari Fujioka, Hiroshima (JP)

(73) Assignee: Adtec Plasma Technology Co., Ltd., Hiroshima (JP)

( * ) Notice: Subject to any disclaimer, the term of this patent is extended or adjusted under 35 U.S.C. 154(b) by 1124 days.

(21) Appl. No.: 10/594,746

(22) PCT Filed: Mar. 25, 2005

(86) PCT No.: PCT/JP2005/005523

§ 371 (c)(1),
(2), (4) Date: Sep. 28, 2006

(87) PCT Pub. No.: WO2005/099322

PCT Pub. Date: Oct. 20, 2005

(65) Prior Publication Data

US 2007/0210038 A1 Sep. 13, 2007

(30) Foreign Application Priority Data

Mar. 31, 2004 (JP) ............................ 2004-105472

(51) Int. Cl.
*B23K 9/02* (2006.01)
*H05B 31/26* (2006.01)

(52) U.S. Cl. ............................ 219/121.48; 315/111.21

(58) Field of Classification Search ........................ 219/121.36–121.59; 315/111.21–111.91; 204/298.37, 204/298.38
See application file for complete search history.

(56) References Cited

U.S. PATENT DOCUMENTS

| | | | | |
|---|---|---|---|---|
| 4,611,108 | A | 9/1986 | Leprince et al. | |
| 5,053,678 | A * | 10/1991 | Koike et al. | 315/111.81 |
| 5,770,273 | A | 6/1998 | Offer et al. | |
| 6,388,225 | B1 * | 5/2002 | Blum et al. | 219/121.48 |
| 6,551,427 | B2 * | 4/2003 | Sakamoto et al. | 156/89.12 |
| 2003/0052612 | A1 | 3/2003 | Tanabe | |

FOREIGN PATENT DOCUMENTS

| | | |
|---|---|---|
| JP | H6-295797 | 10/1991 |
| JP | 2002-543985 | 10/1994 |
| JP | H3-222298 | 12/1995 |
| JP | H7-321096 | 12/2002 |

* cited by examiner

*Primary Examiner*—Sang Y Paik
(74) *Attorney, Agent, or Firm*—Kirschstein, etal.

(57) ABSTRACT

A coaxial microwave plasma torch, comprising, an outside conductor (1) formed in a cylindrical shape, a cylindrical electric discharge tube (3) fixedly inserted into an axial hole (2) formed in the outside conductor on one end face (4) side, and a coaxial cable (6) having one end fitted to the other end face of the outside conductor. An antenna (9) electrically connected to an inside conductor (8) is fitted to the one end of the coaxial cable and extended into the electric discharge tube through a through-hole (11) axially passed through between the other end face (5) of the outside conductor and the bottom face of the axial hole. The outside conductor (7) of the coaxial cable is electrically connected to the outside conductor, and a gas inlet pipeline (13) supplying a gas into the electric discharge tube is fitted in the outside conductor.

6 Claims, 4 Drawing Sheets

A

B

COAXIAL MICROWAVE PLASMA TORCH

TECHNICAL FIELD

The present invention relates to a microwave plasma torch, and particularly to a coaxial microwave plasma torch

BACKGROUND ART

As a microwave plasma torch capable of generating plasma in atmospheric pressure, there is conventionally known a waveguide microwave plasma torch (see Patent Document No. 1). This conventional waveguide microwave plasma torch roughly includes three components: a stub tuner, a waveguide and a reflecting plate, and the torch further requires an ignition device for generating plasma in atmospheric pressure and thus has a large number of components. Hence the conventional waveguide microwave plasma torch has a problem of having a low degree of flexibility in device design to limit an attempt to downsize the device.

As a plasma torch to solve this drawback of the conventional waveguide plasma torch, there is proposed a coaxial microwave plasma torch having a configuration inherited from a configuration of a helical resonator (see Patent Document No. 2). This microwave plasma torch has a coaxial resonator including a cylindrical outer tube having an upper-end opening closed with a lid, and a coaxial line coupled at right angles to the outer tube of the resonator at a part closer to the upper end. The conductor passing through the inner center of the coaxial line is bent upward in a direction toward the lid inside the outer tube to be fixed to the inner end face of the lid, the lid is connected to an outside conductor of the coaxial line through the outer tube, an inside conductor is fixed to the center of the lid, the inside conductor includes a stick section and an electrode which has an electric conductivity and is fixed to the top of the stick section, a silica tube is fitted to the peripheral face of the electrode, and a gas inlet for guiding gas from the outside toward the electrode is provided in the peripheral wall of the outer tube.

In this microwave plasma torch, when a microwave is outputted with a microwave oscillator connected to the coaxial line, the microwave is allowed to pass through the coaxial line to be converted into a coaxial mode (TEM mode) and then transmitted. Subsequently, the microwave is once mode-converted at the section where the conductor passing through the inner center of the coaxial line is bent in a direction toward the lid inside the outer tube of the oscillator, and converted again into the coaxial mode inside the oscillator to be led to the electrode by the inside conductor, whereby electric fields of the microwave are concentrated at the top of the electrode to maximize the electric field intensity, and a plasma is thus generated from the top of the electrode.

However, according to this configuration, the use of the oscillator has required the plasma torch to be kept in a certain degree of size, making it difficult to downsize the plasma torch. Further, according to this configuration, the microwave is once converted from a coaxial mode into another mode and then again converted into the coaxial mode during transmission of the microwave from the coaxial line into the oscillator, but there has been a problem that, when such mode conversion is performed, energy loss occurs in response to the conversion, thereby decreasing an energy efficiency. In addition, according to this configuration, it has been difficult to ignite plasma in atmospheric pressure.

Patent Document No. 1: Japanese Laid-Open Patent Publication No. H9-295900.

Patent Document No. 2: Japanese Laid-Open Patent Publication No. H6-188094.

DISCLOSURE OF INVENTION

Problems to be Solved by the Invention

Accordingly, it is an object of the present invention is to provide a coaxial microwave plasma torch which has a smaller size and higher energy efficiency than those of the conventional microwave plasma torch and which is further capable of generating plasma with ease with atmospheric pressure.

Means for Solving the Problems

In order to solve the above-mentioned problems, a first invention provides a coaxial microwave plasma torch, including a cylindrical outside conductor; a cylindrical electric discharge tube, fixedly inserted into an axial hole formed in the outside conductor on one end face side; and a coaxial cable for microwave transmission, having one end fitted to the other end face of the outside conductor from outside, wherein an antenna electrically connected to an inside conductor of the coaxial cable is provided at one end thereof, a through-hole extending in an axial direction from the other end face side of the outside conductor toward the axial bole is formed in the outside conductor, the antenna extends in a state electrically insulated from the outside conductor into the electric discharge tube through the through-hole, an outside conductor of the coaxial cable is electrically connected to the outside conductor, and a gas inlet pipeline for supplying gas into the electric discharge tube is provided in the outside conductor.

According to a preferred embodiment of the first invention, a cylindrical space is formed between a peripheral face of the axial hole of the outside conductor and an outer peripheral face of the electric discharge tube, and the cylindrical space extends in a radial direction by previously determined length in the inside of the outside conductor and in an axial direction from the bottom face of the axial hole by arbitrary length.

Further, in order to solve the above-mentioned problems, a second invention provides a coaxial microwave plasma torch, including a torch body with a double-tube configuration having a cylindrical outside conductor and a cylindrical electric discharge tube arranged with a space kept in a radial direction inside the outside conductor, wherein the outside conductor of the torch body has one end opening closed with a lid, the electric discharge tube has one end fixed to the lid and the other end protrudingly extending from the other end opening of the outside conductor, a coaxial cable for microwave transmission has one end fitted to the lid of the outside conductor of the torch body from outside, an antenna electrically connected to an inside conductor of the coaxial cable is fitted to one end thereof, the antenna extends in a state electrically insulated from the lid into the electric discharge tube of the torch body through a through-hole formed in the lid, an outside conductor of the coaxial cable is electrically connected to the outside conductor of the torch body, and a gas inlet pipeline for supplying gas into the electric discharge tube of the torch body is provided in the torch body.

According to a preferred embodiment of the second invention, a cylindrical auxiliary conductor is fitted into a cylindrical space formed between the outside conductor and the electric discharge tube in the torch body from the other end opening side of the outside conductor, and the auxiliary conductor slides along the axial direction of the electric discharge tube without causing leakage of a microwave into a space formed with the inner peripheral face of the outside conductor and a space formed with the outer peripheral face of the electric discharge tube, while being in electrical contact with the outside conductor of the torch body, so as to appropriately change a phase of a microwave.

According to another preferred embodiment of the second invention, the gas inlet pipeline extends from the outside of the torch body into a cylindrical space between the outside conductor and the electric discharge tube through both or one of the outside conductor and the lid and then is connected to the electric discharge tube to open to a region in the vicinity of the top of the antenna in the electric discharge tube.

According to the further embodiment of the second invention, the lid of the torch body has at least an inserting section which is made of a cylindrical dielectric material and inserted into the outside conductor, the electric discharge tube have one end fixed to the inserting section, and the gas inlet pipeline includes: a tube portion, which has an electrical insulating property and passes through the outside conductor of the torch body from the outside of the torch body; a first tube portion, which is connected to the tube portion and passes through the inserting section of the lid; and a second tube portion, which is connected to the first tube portion, and extends inwardly in the inside of the antenna and then extends in the axial direction toward the top of the antenna in the inside thereof, to open to the top.

According to the further preferred embodiment of the first and second inventions, the antenna is made of the inside conductor of the coaxial cable. ps Effects of the Invention According to the present invention, since the whole of a plasma torch maintains its coaxial configuration and thus includes no oscillator, different from the conventional microwave plasma torch, a microwave to be transmitted in a coaxial cable is supplied in a coaxial mode as it is to an antenna, and plasma generates at the tip of the antenna. Therefore, energy efficiency of the plasma torch is significantly higher than in the conventional case, and further, plasma can be generated with ease even in atmospheric pressure. Moreover, according to the present invention, different from the conventional waveguide plasma torch, there is no need to use a matching device or a light reflector so that a larger degree of freedom in design can be obtained and the plasma torch can thus be downsized.

DESCRIPTION OF REFERENCE NUMERALS

Figure 1:
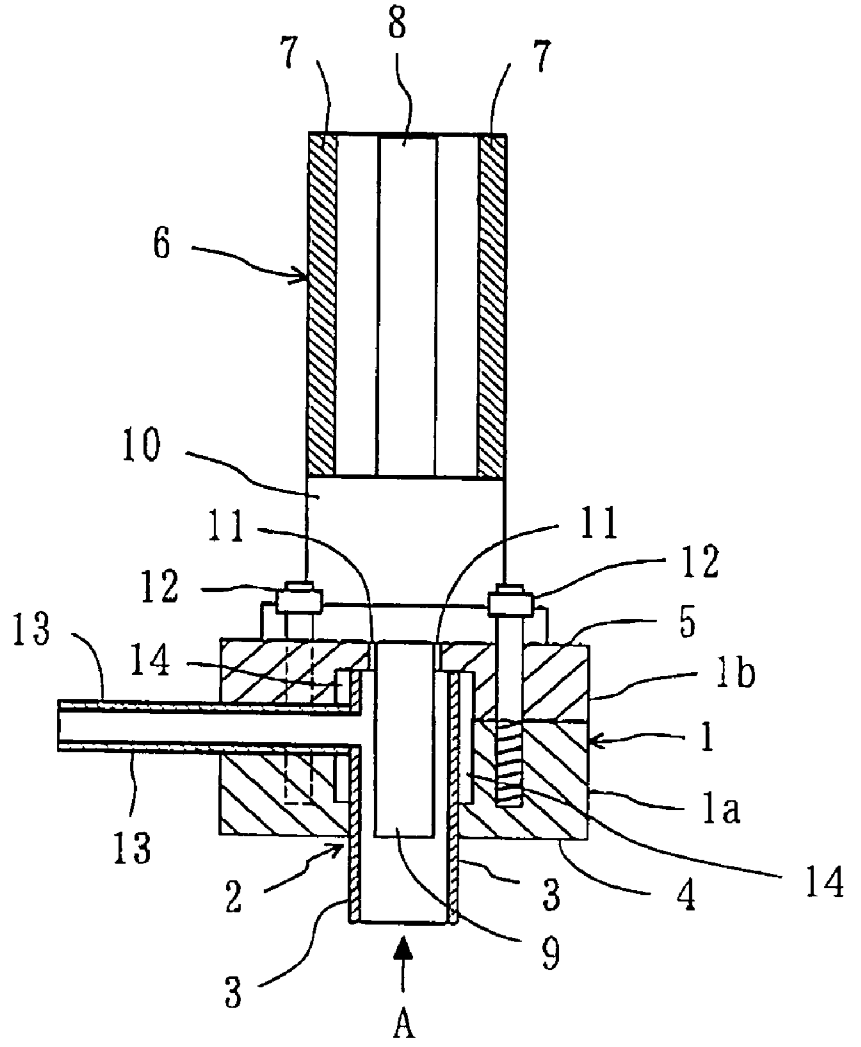
FIG. 1 shows a coaxial microwave plasma torch according to one example of the present invention: (A) is a sectional side view; and (B) is a plan view as seen from a direction indicated by arrow A.
Figure 1:
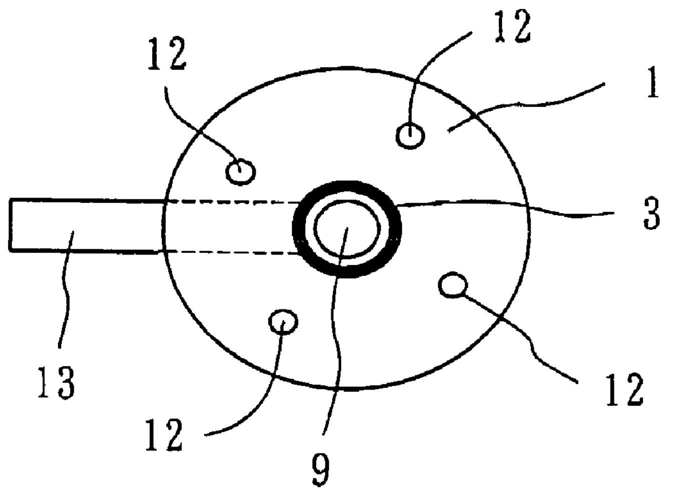

1. Outside conductor
2. Axial hole
3. Electric discharge tube
4. One end face
5. Other end face
6. Coaxial cable
7. Outside conductor
8. Inside conductor
9. Antenna
10. Coaxial connector
11. Through-hole
12. Bolt
13. Gas inlet pipeline
14. Cylindrical space

Best Mode for Carrying Out the Invention

In the following, a preferred example of the present invention is described with reference to attached drawings. FIG. 1 shows a coaxial microwave plasma torch according to one example of the present invention: (A) is a sectional side view, and (B) is a plan view as seen from a direction indicated by arrow A. With reference to FIG. 1, the coaxial microwave plasma torch of the present invention includes: an outside conductor 1 formed in a cylindrical shape; a cylindrical electric discharge tube 3, fixedly inserted into an axial hole 2 formed in the outside conductor 1 on one end face side 4; and a coaxial cable 6 for microwave transmission, having one end fitted to the other end face 5 of the outside conductor 1 from outside.

In this example, the outside conductor 1 is constituted by a bonded article of a cylindrical first portion 1*a* on the one end face 4 side and a cylindrical second portion 1*b* on an other end face 5 side. Further, the axial hole 2 extends along a central axis of the outside conductor 1, and the electric discharge tube 3 is arranged coaxially with the outside conductor 1. Moreover, the electric discharge tube 3 is formed of a dielectric material such as a silica tube or an aluminum tube.

An antenna 9, electrically connected to an inside conductor 8 of a coaxial cable 6, is provided at one end of the coaxial cable 6. In this example, a coaxial connector 10 is fitted to one end of the coaxial cable 6, and the inside conductor 8 of the coaxial cable 6 and the antenna 9 are electrically connected with each other through the coaxial connector 10. Further, a through-hole 11 extending in an axial direction from the other end face 5 side toward the axial hole 2 is formed in the outside conductor 1, and the coaxial connector 10 is fitted to the other end face 5 of the outside conductor 1 with a bolt 12 such that the antenna 9 protrudes in a state electrically insulated from the outside conductor 1 inside the electric discharge tube 3 through the through-hole 11. In this case, the bolt 12 is used not only to fit the coaxial connector 10 to the outside conductor 1 but also to bond the first portion 1*a* and the second potion 1*b* of the outside conductor 1. Simultaneously, an outside conductor 7 of the coaxial cable 6 is electrically connected to the outside conductor 1 through the coaxial connector 10.

The antenna 9 is formed of a material having high electric conductivity. The antenna 9 and the through-hole 11 of the outside conductor 1 are arranged with a space there-between kept in a radial direction, whereby the antenna 9 and the outside conductor 11 are electrically insulated from each other. The antenna 9 is preferably provided with a suitable surface coating so as to prevent mixture of an impurity into plasma at the time of plasma generation. While the antenna 9 is formed as a component independent of the inside conductor 8 of the coaxial cable 6 in this example, the antenna 9 may be formed from the inside conductor 8.

The axial hole 2 of the outside conductor 1 extends in the axial direction from the bottom of the hole 2 by arbitrary length (though not reaching one side face 4 of the outside conductor 1) and has a diameter larger than the outer diameter of the electric discharge tube 3 by previously determined length, and in this region (inside the outside conductor 1), a cylindrical space 14 having previously determined thickness in the radial direction and arbitrary length are formed between the inner peripheral face of the hole 2 and the outer peripheral of the electric discharge tube 3.

The cylindrical space 14 is used for matching transmission impedance. Matching of transmission impedance is performed by bringing a ratio between the diameters of the inside conductor 8 of the 6 coaxial cable and the outside conductor 7 of the coaxial cable 6 into line with a ratio between the outer diameter of the antenna 9 and the inner diameter of the outside conductor 1. In this case, the inner diameter of the outside conductor 1 is determined based upon radial length of the cylindrical space 14 in the inside of the outside conductor 1. In addition, it may not be necessary to arrange the cylindrical space 14 between the outside conductor 1 and the electric discharge tube 3.

The outside conductor 1 is provided with a gas inlet pipeline 13 for supplying gas into the electric discharge tube 3. The gas inlet pipeline 13 is constituted by a tube made of a dielectric material such as a silica tube, and extends into the cylindrical space 14 through a radial through-hole formed in the outside conductor 1, and one end of the gas inlet pipeline 13 is connected to the electric discharge tube 3 to open into the electric discharge tube 3.

With the above-mentioned configuration, a microwave oscillator (not shown) is connected to the other end of the coaxial cable 6 and a microwave with a prescribed wavelength is outputted from the microwave oscillator in atmospheric pressure. Further, a gas supply source (not shown) is connected to the gas inlet pipeline 13. Simultaneously with guidance of gas from the gas supply source into the antenna 9 through the gas inlet pipeline 13, a microwave outputted from the microwave oscillator is transmitted in the coaxial cable 6 and then transmitted in a coaxial mode to the antenna 9 through the coaxial connector 10. The microwave propagates on the surface of the antenna 9, to generate the maximum electric field at the top of the antenna 9, and plasma is generated between the top of the antenna 9 and the inside wall of the electric discharge tube 3, to be irradiated from the top opening of the electric discharge tube 3.

Since the coaxial microwave plasma torch according to the present invention is held in a coaxial configuration as a whole, and thus does not includes an oscillator as does the conventional microwave plasma torch for which a coaxial oscillator is used, the microwave transmitted in the coaxial cable is supplied in the coaxial mode as it is to the antenna to generate plasma. Therefore, the plasma torch has energy efficiency significantly higher than in the conventional case, and is capable of igniting plasma with ease even in atmospheric pressure so as to maintain the plasma. Further, according to the present invention, it is not necessary to use a matching device or a light reflector as in the case of the conventional waveguide plasma torch, and the number of components of the plasma torch can thus be small, making it possible to obtain a large degree of freedom in design to downsize the plasma torch.

Figure 2:
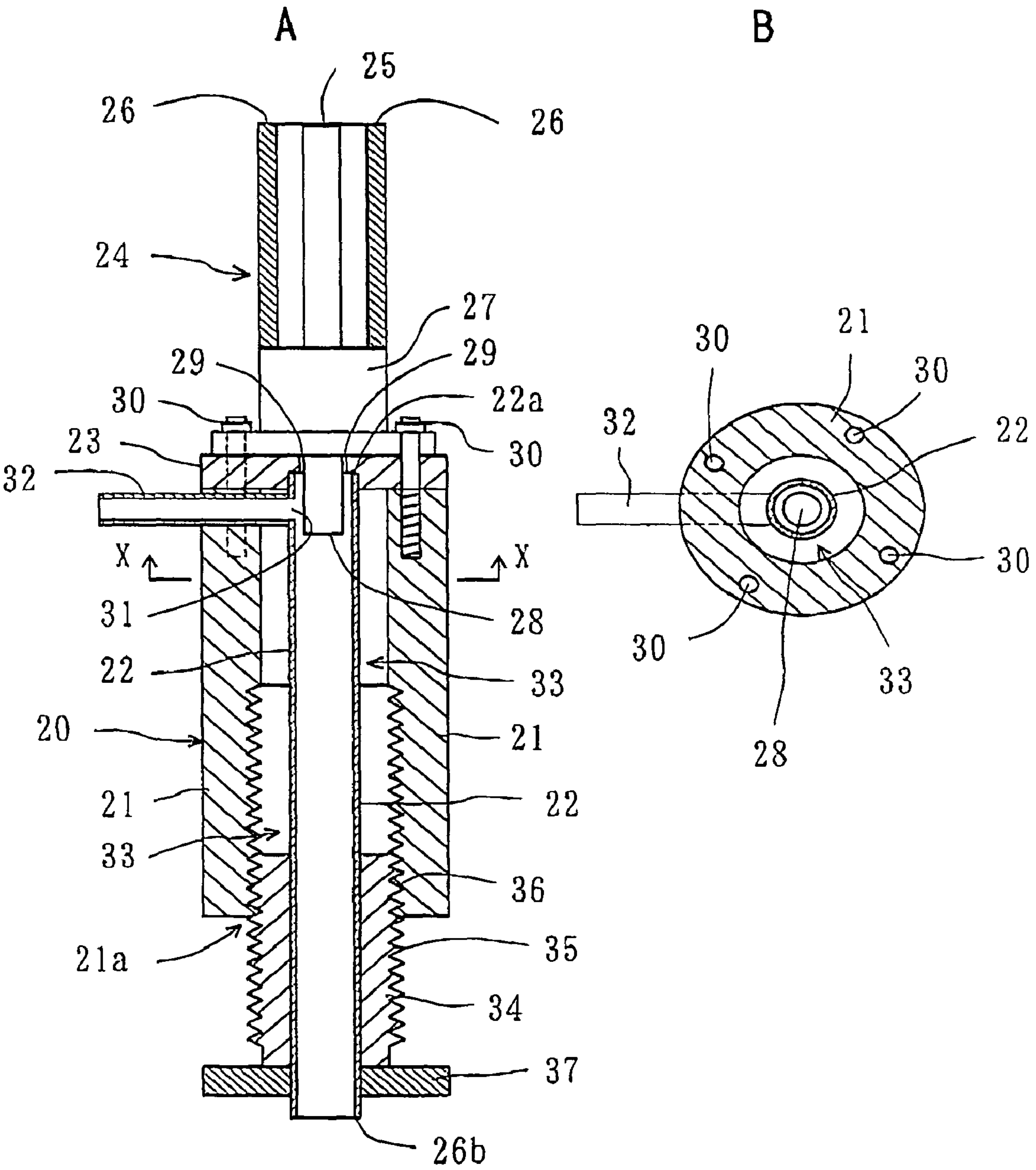
FIG. 2 shows a coaxial microwave plasma torch according to another example of the present invention: (A) is a sectional side view; and (B) is a sectional view taken along X-X line of (A).

FIG. 2 shows a coaxial microwave plasma torch according to another example of the present invention: (A) is a sectional side view; and (B) is a sectional view along the X-X line of (A). As shown in FIG. 2, the coaxial microwave plasma torch of the present invention includes a torch body 20 having a double tube configuration constituted by a cylindrical outside conductor 21 and an electric discharge tube 22 arranged with a space kept in the radial direction inside the outside conductor 21.

The outside conductor 21 of the torch body 20 has one end opening closed with a lid 23. In this example, the lid 23 is formed of a material having conductivity. The electric discharge tube 22 has one end **22*a* fixed to the lid 23, and the other end 22*b* protrudingly extending from the other end opening 21*a* of the outside conductor 21. The electric discharge tube 22 is formed of a dielectric material such as a silica tube or an alumina tube, and electrically insulated from the lid 23. Further, a coaxial cable 24 for microwave transmission has one end fitted to the lid 23 of the outside conductor 21 of the torch body 20 from outside, and an antenna 28 electrically connected to the inside conductor 25 is provided at one end of the coaxial cable 24**.

In this embodiment, a coaxial connector 27 is fitted to one end of the coaxial cable 24, and the inside conductor 25 of the coaxial cable 24 and the antenna 28 are electrically connected with each other through the coaxial connector 27. The coaxial connector 27 is fitted to the lid 23 with a bolt 30 such that the antenna 28 in a state electrically insulated from the lid 23 protrudes in the axial direction of the electric discharge tube 22 inside the electric discharge tube 22 of the torch body 20 through the through-hole 29 formed in the lid 23. In this case, the bolt 30 is used not only to fit the coaxial connector 27 to the lid 23 but also to electrically bond the lid 23 to the outside conductor 21. Simultaneously, an outside conductor 26 of the coaxial cable 24 is electrically connected to the outside conductor 21 of the torch body 20 through the coaxial connector 27.

The antenna 28 is formed of a material having high electric conductivity. The antenna 28 and the through-hole 29 of the lid 23 are arranged with a space therebetween kept in the radial direction, whereby the antenna 28 and the lid 23 are electrically insulated from each other. The antenna 28 is preferably provided with a suitable surface coating so as to prevent mixture of an impurity into plasma at the time of plasma generation. While the antenna 28 is formed as a component independent of the inside conductor 25 of the coaxial cable 24 in this example, the antenna 28 may be formed from the inside conductor 25.

Further, matching of transmission impedance is performed by bringing a ratio between the outer diameter of the antenna 28 and the inner diameter of the outside conductor 21 into line with a ratio between the diameters of the inside conductor 25 and the outside conductor 26.

A gas inlet pipeline 32 for supplying gas into the electric discharge tube 22 of the torch body 20 is provided in the torch body 20. The gas inlet pipeline 32 is constituted by a tube made of a dielectric material such as a silica tube, and extends into a space 33 between the outside conductor 21 and the electric discharge tube 22 through a radial through-hole formed in the outside conductor 21 from the outside of the outside conductor 21, and one end of the gas inlet pipeline 32 is fitted to the electric discharge tube 22, to open to a region in the vicinity of the top of the antenna 28 in the electric discharge tube 22.

A cylindrical auxiliary conductor 34 is fitted in the cylindrical space 33 formed between the outside conductor 21 and the electric discharge tube 22 in the torch body 20, from the other end opening 21a side of the outside conductor 21. Further, a thread 35 is provided on the outer peripheral face of the auxiliary conductor 34, while a thread groove 36 to be engaged in the thread 35 of the auxiliary conductor 34 is provided on the inner peripheral face of the outside conductor 21. The auxiliary conductor 34 is rotated around the electric discharge tube 22 so that the auxiliary conductor 34 can slide along the axial direction of the electric discharge tube 22 without causing leakage of a microwave into a space formed with the inner peripheral face of the outside conductor 21 and a space formed with the outer peripheral face of the electric discharge tube 22, while being in electrical contact with the outside conductor 21 of the torch body 20. It is to be noted that numeral 37 denotes an operational knob, which is bonded to the auxiliary conductor 35 and serves to facilitate rotational operation of the auxiliary conductor 35.

Figure 3:
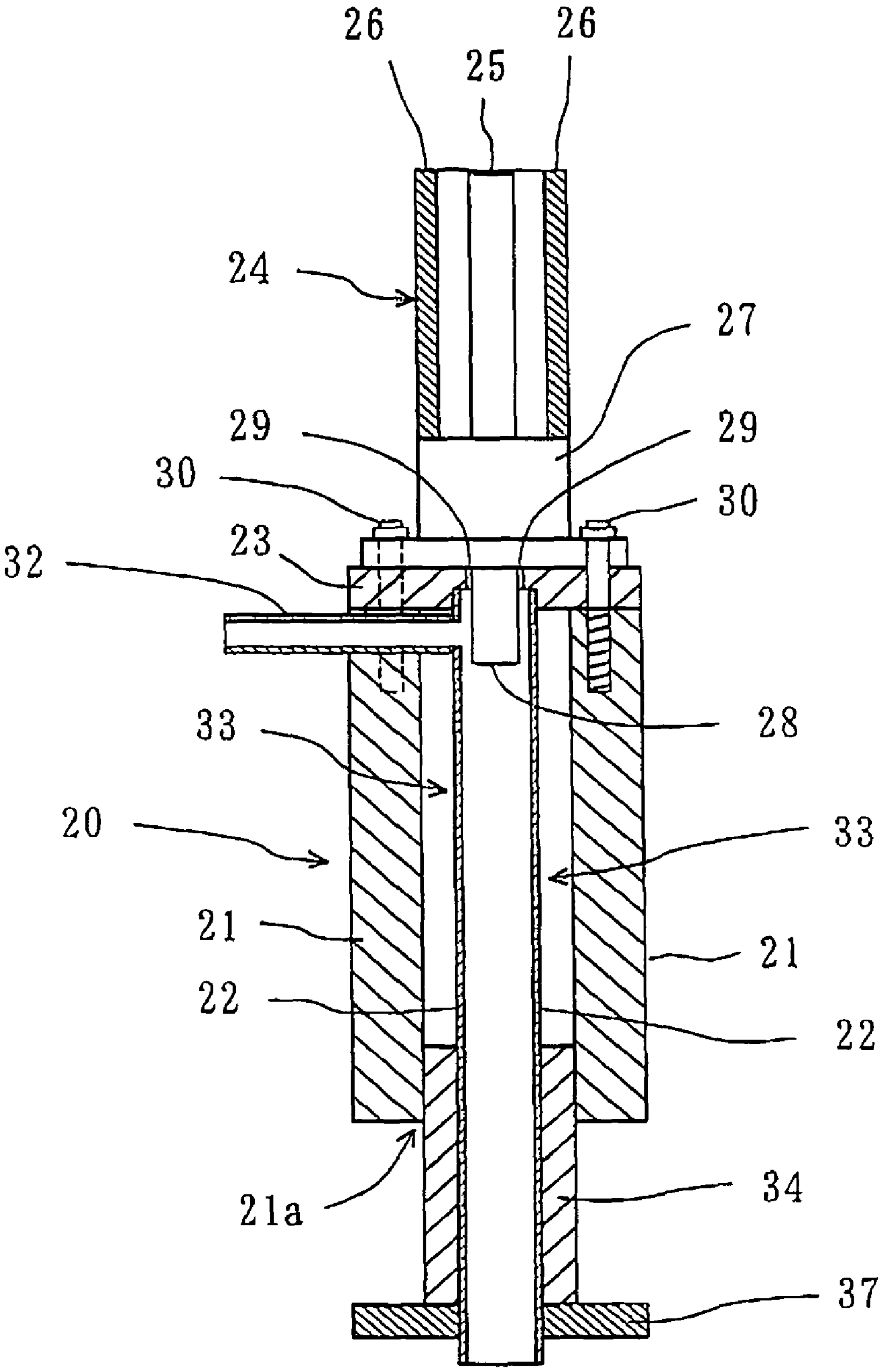
FIG. 3 is a sectional side view showing a modified example of the example of FIG. 2.

While the auxiliary conductor 34 is engaged with the screw in the outside conductor 21 to be slidable along the axial direction of the electric discharge tube 22 in this example, another configuration may be formed for example as shown in FIG. 3 where the outer peripheral face of the auxiliary conductor 34 is in contact with the inner peripheral face of the outside conductor 21 and the inner peripheral face of the auxiliary conductor 34 is in contact with the outer peripheral face of the electric discharge tube 22 so that the auxiliary conductor 34 can be made slidable without means of the screw engagement.

With the above-mentioned configuration, a microwave oscillator (not shown) is connected to the other end of the coaxial cable 24 and a microwave with a prescribed wavelength is outputted from the microwave oscillator in atmospheric pressure. Further, a gas supply source (not shown) is connected to the gas inlet pipeline 32. Simultaneously with guidance of gas from the gas supply source into the electric discharge tube 22 through the gas inlet pipeline 32, the microwave outputted from the microwave oscillator is transmitted in the coaxial cable 24 and then transmitted in the coaxial mode to the antenna 28 through the coaxial connector 27. Subsequently, the microwave propagates on the surface of the antenna 28 to generate the maximum electric field at the tip of the antenna 28, and plasma is generated between the tip of the antenna 28 and the inside wall of the electric discharge tube 22, to be irradiated from the top opening of the electric discharge tube 22.

Also in this embodiment, the same effect as in the example of FIG. 1 can be obtained, and it is possible particularly in this example to generate long plasma by maintaining the plasma inside the electric discharge tube 22.

Figure 4:
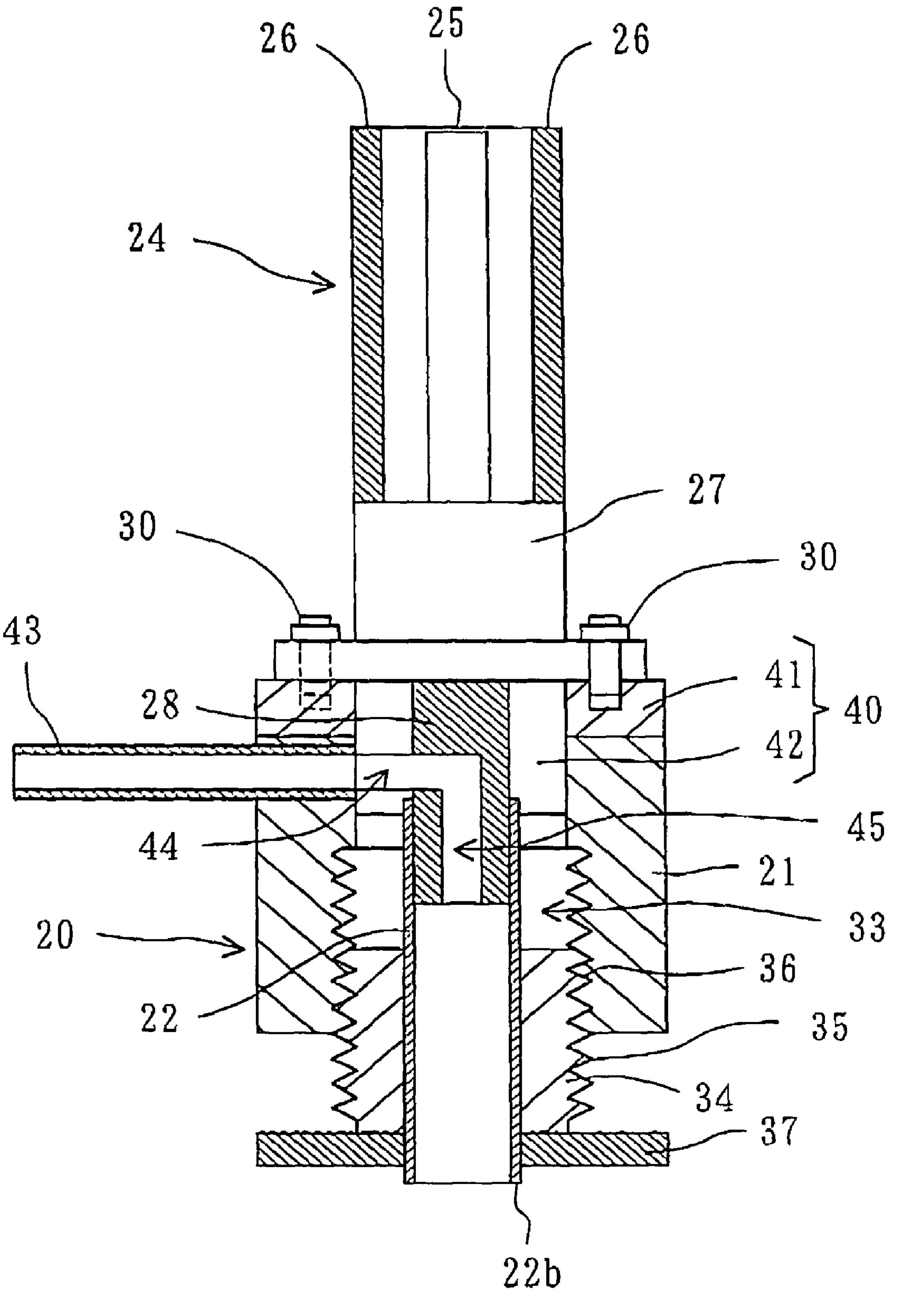
FIG. 4 is a sectional side view of a coaxial microwave plasma torch according to still another example of the present invention.

FIG. 4 is a sectional side view of a coaxial microwave plasma torch according to still another example of the present invention. An example shown in FIG. 4 is essentially different from the example of FIG. 2 only in the configuration of the lid as well as the configuration of the gas inlet pipeline. Therefore, in FIG. 4, the same numerals are provided to the same components as those in FIG. 2 and descriptions thereof are omitted.

With reference to FIG. 4, a lid 40 of the torch body 20 is formed by: an inserting section 42 which is made of a cylindrical dielectric material and is to be inserted into the outside conductor 21; and a flange section 41 provided at one end of the inserting section 42. The electric discharge tube 22 has one end fixed to the inserting section 42.

In this embodiment, the gas inlet pipeline includes: a tube portion 43, which has an electrical insulating property and passes through the outside conductor 21 of the torch body 20 in the radial direction from the outside of the torch body 20; a first tube portion 44, which is connected to the tube portion 43 and passes through the inserting section 42 of the lid 40 in the radial direction; and a second tube portion 45, which is connected to the first tube portion 44, and extends inwardly in the radial direction in the inside of the antenna 28 and then extends in the axial direction toward the top of the antenna 28 in the inside thereof, to open to the top.

In this embodiment, with the above-mentioned configuration, gas is guided into the electric discharge tube 22 from the top of the antenna 28. Also in this example, the same effect as in the example of FIG. 2 can be obtained.

INDUSTRIAL APPLICABILITY

According to the present invention, it is possible to provide a coaxial microwave plasma torch with a very small size and high energy efficiency, which is capable of generating plasma with ease in atmospheric pressure. The microwave plasma torch according to the present invention is usable, in place of a conventional waveguide microwave plasma torch, in an etching device, a CVD device, a surface processing device, a surface modification device, a material modification device, and the like.

The invention claimed is:

1. A coaxial microwave plasma torch, comprising:

a solid cylindrical outside conductor;

a cylindrical electric discharge tube inserted into, and fixed to, an axial hole at one end of said electric discharge tube, said axial hole being formed on one end face of said outside conductor, said electric discharge tube having another end protruding from said axial hole; and a coaxial cable for microwave transmission fitted at one end of said coaxial cable to an other end face of said outside conductor from outside, wherein an antenna is electrically connected to an inner conductor of said coaxial cable at said one end of said coaxial cable, a through-hole is formed in said outside conductor in such a way that said through-hole extends in an axial direction from the other end face of said outside conductor toward said axial hole, said antenna is electrically insulated from said outside conductor and extends into said electric discharge tube along the axial direction through said through-hole, an outer conductor of said coaxial cable is electrically connected to said outside conductor, a gas inlet pipeline for supplying gas into said electric discharge tube is provided in said outside conductor, and a cylindrical space is formed between a peripheral surface of said axial hole of said outside conductor and an outer surface of said electric discharge tube, said cylindrical space having a predetermined radial length and extending in the axial direction from a bottom face of said axial hole at an arbitrary length such that said cylindrical space does not reach said one end face of said outside conductor.

2. The coaxial microwave plasma torch according to claim 1, wherein said antenna consists of said inner conductor of said coaxial cable.

3. A coaxial microwave plasma torch, comprising:

a torch body with a double-tube configuration which consists of a cylindrical outside conductor; and a cylindrical electric discharge tube arranged inside said outside conductor at a radial spacing therebetween, wherein said outside conductor of said torch body has one end opening closed with a lid, said electric discharge tube is fixed to said lid at one end thereof and an other end of said electric discharge tube protrudes from an other end opening of said outside conductor of said torch body, a coaxial cable for microwave transmission is attached at one end thereof to said lid of said outside conductor of said torch body from outside, an antenna electrically connected to an inner conductor of said coaxial cable is fitted to said one end of said coaxial cable, said antenna is electrically insulated from said lid and extends into said electric discharge tube of said torch body through a through-hole formed in said lid, an outer conductor of said coaxial cable is electrically connected to said outside conductor of said torch body, a gas inlet pipeline is arranged in said torch body for supplying gas into said electric discharge tube of said torch body is provided in said torch body, and a cylindrical auxiliary conductor is fitted from an other end opening of said outside conductor into a cylindrical space between said cylindrical outside conductor and said electric discharge tube in such a way that said cylindrical auxiliary conductor can slide along an axial direction of said electric discharge tube while preventing leakage of a microwave from a gap between said cylindrical auxiliary conductor and said outside conductor and a gap between said cylindrical auxiliary conductor and said electric discharge tube, and being in electrical contact with said outside conductor so as to adjust a phase of the microwave.

4. The coaxial microwave plasma torch according to claim 3, wherein said gas inlet pipeline extends from the outside of said torch body into a cylindrical space between said outside conductor and said electric discharge tube through both or either of said outside conductor and said lid, is connected to said electric discharge tube, and opens to a region in a vicinity of a top of said antenna in said electric discharge tube.

5. The coaxial microwave plasma torch according to claim 3, wherein said lid of said torch body has at least a solid cylindrical inserting section of dielectric material which is inserted into said outside conductor, said electric discharge tube is fixed to said inserting section at one end thereof, and said gas inlet pipeline includes:

a tube portion of electrical insulation extending through said outside conductor of said torch body from the outside of said torch body;

a first tube portion connected to said tube portion and extending through said inserting section of said lid; and a second tube portion connected to said first tube portion, extending inwardly along a radial direction in said antenna and then extending along the axial direction toward a top of said antenna in in said antenna so as to open at said top.

6. The coaxial microwave plasma torch according to claim 3, wherein said antenna consists of said inner conductor of said coaxial cable.

* * * * *